United States Patent Office 3,770,634
Patented Nov. 6, 1973

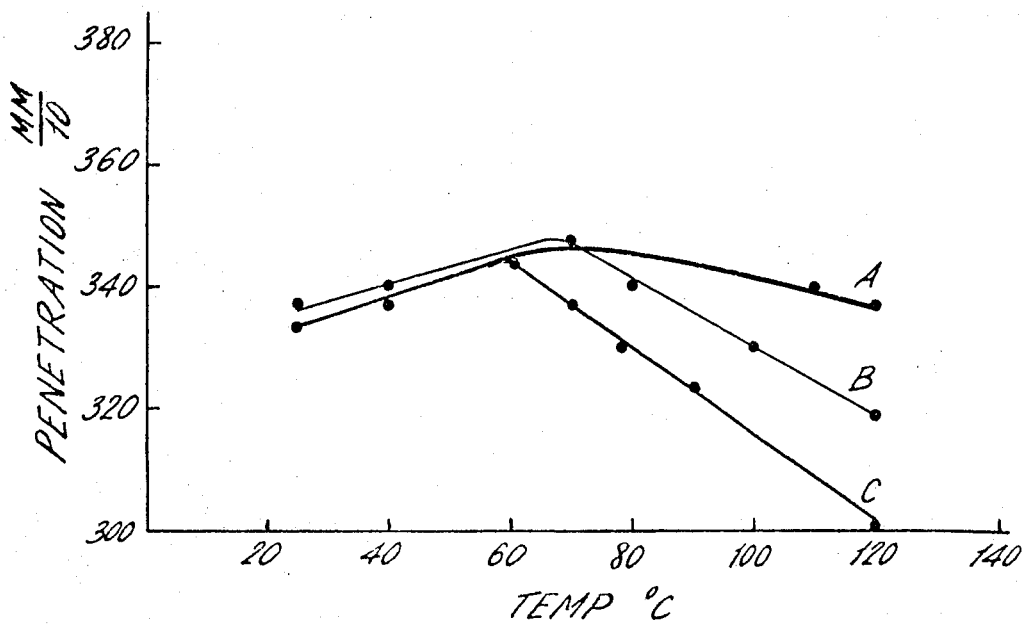

3,770,634
GREASE COMPOSITION
Stanley Charles Dodson, Leatherhead, and Kenneth James Hole, Wokingham, England, assignors to The British Petroleum Company Limited, London, England
Filed Nov. 30, 1971, Ser. No. 203,395
Claims priority, application Great Britain, Dec. 1, 1970, 56,965/70
Int. Cl. C10m 5/08, 7/12
U.S. Cl. 252—29
3 Claims

ABSTRACT OF THE DISCLOSURE

Oleophilic graphite thickened grease containing a small amount of petroleum paraffinic wax.

---

This invention relates to greases thickened by oleophilic graphite. Oleophilic graphite greases can be prepared by the methods described in U.K. Pat. 1,168,764 and U.K. patent application 41,249/69.

In some applications it has been found that at high temperatures there is a tendency for oleophilic graphite greases to harden i.e. to have a lower penetration value.

We have now found that the modification of oleophilic graphite by the addition of a wax to it can decrease the effect of this hardening in grease compositions.

According to the invention there is provided a method of providing a wax modified oleophilic graphite which comprises contacting oleophilic graphite or graphite which is treated so as to become oleophilic with a wax.

The invention also provides grease compositions comprising a lubricating base oil thickened to a grease consistency by the wax modified oleophilic graphite produced according to the invention.

The accompanying drawing is a graph showing by the graph lines A, B and C the effect of the addition of wax in a grease composition of this invention in preventing hardening of the grease at higher temperatures without having any appreciable effect at lower temperatures.

Oleophilic graphite can be produced by grinding a natural or synthetic graphite in an organic liquid. Preferably the grinding takes place in the absence of air.

Those liquids distilling below 500° C. and having a viscosity below 600 centistokes at 100° F. (38° C.) are therefore preferred. (Liquids having a surface tension below 72 dynes/cm., preferably from 10 to 40 cynes/cm., at 25° C. are also preferred.)

Suitable organic liquids are lower molecular weight hydrocarbons, including straight-chain or branched-chain, saturated or unsaturated aliphatic compounds, saturated or unsaturated, substituted or unsubstituted, cyclo-aliphatic compounds, and substituted or unsubstituted aromatic compounds. Examples of such compounds are n-heptane, cyclohexane, benzene or toluene. Other suitable organic liquids are those compounds which contain fluorine, chlorine, or phosphorus and chlorine, for example, carbon tetrachloride.

Other suitable organic liquids are the polar oxygen compounds such as isopropyl alcohol. Silicone fluids can also be used.

For best results, the amount of the compound in the compound organic liquid mixture should not exceed 50% wt.; preferably it should be from 2 to 20% wt.

The grinding may be carried out in any suitable grinding mill or device and it is desirable to continue the grinding until an oleophilic graphite having a surface area (as determined by nitrogen adsorption) of from 20 to 800, preferably from 30 to 200, square metres per gram is obtained.

Usually this can be achieved by grinding at normal temperatures for the required period but the temperature of the mixture may be artificially increased if desired, for example, up to 400° F. In this case, liquids which have viscosities up to 600 centistokes at 100° F. (38° C.) may be used, for example, mineral lubricating oils, ranging from "spindle" oils to "bright stocks."

One technique is to carry out the grinding in a vibratory ball mill.

It is desirable to exclude air so far as possible during the grinding operation and this can be most easily achieved by filling the mill with the organic liquid first, followed by the balls and the graphite. A suitable procedure is to fill the mill with the liquid, and half the balls, then the compound and finally the rest of the balls. Such grinding procedure might be referred to as a "closed" system.

When using a ball mill, it is of course desirable to use balls made of a material which does not react with the graphite and which does not wear unduly during the grinding. Vibratory ball mills usually contain steel balls and these are suitable for the present purpose. It is preferred to use a hard grade of steel for the balls and for the grinding chamber.

A magnetic filter can be used, if desired, to remove small steel particles from the slurry that is produced in the grinding operation. A circulatory system can also be used wherein the slurry is pumped through an external magnetic filter and then returned to the mill. The circulatory system can be run semi-continuously, the slurry being pumped out after the grinding period and fresh material added to the system.

A suitable vibratory ball mill is sold under the trade name "Megapact," manufactured by Pilamec Limited.

As an initial step the slurry of oleophilic compound that is produced in the grinding operation can be separated from the grinding balls by sieving or by displacement of the grinding liquid by another liquid and sieving.

If a relatively high boiling organic liquid is used for grinding it may be desirable to displace this liquid by a low boiling liquid. This liquid can then be removed by boiling. It is preferred to use vigorous boiling.

It is also possible to filter the slurry to obtain a filter cake of the oleophilic compound.

In either case it is preferred to remove the last traces of grinding liquid or displacing liquid by heating the oleophilic compound in a vacuum oven for several hours, for example, at 100° C. and at 1 mm. mercury.

Another technique is to use an agitator mill as the grinding mill.

By agitator mill is meant a mill in which the grinding takes place by the agitation of grinding particles by the rotation of an axle having projection attached thereto.

In the agitator mills useful in the present invention the axle is mounted in a casing on air-tight bearings. Preferably the grinding particles are high density balls e.g. of steel or zircon, preferably of average diameter of less than 5 mm., and the casing is made of steel.

The projections on the axle may be in the form of, for example, discs, rods, paddles or propellers or any other suitable shape. In the preferred mills of the present invention the projections are parallel discs.

The grinding liquid used may be any organic liquid which does not react with the graphite and preferably is a compound or mixture of compounds obtained by distillation of petroleum.

Preferably it is a paraffinic hydrocarbon.

The mill may be used to grind solids in a batch process by filling the mill with the grinding particles, the graphite to be ground and organic liquid, making sure the mill is completely full of liquid to avoid air contamination. The mill is then operated for a fixed time and the organic grinding liquid ground solid slurry removed from the grinding particles.

Agitator mills are usually designed to work within preferred viscosity ranges and during the grinding the viscosity of the grinding liquid increases owing to the effect of the ground solid. In order to maintain optimum grinding conditions the grinding liquid can be diluted during grinding. When the grinding is carried out in a mixture of oil and a volatile liquid then the dilution can take place by the addition of more of a mixture of these liquids. When grinding takes place in the presence of oil alone then more oil can be added during grinding to maintain the viscosity between the desired limits.

In a preferred embodiment of the invention the mill is operated in a cyclic process. In this embodiment the mill forms part of a closed circuit capable of circulating the organic grinding liquid and solid to be ground. The circuit is filled with the organic liquid and the solid material and grinding particles placed in the mill. The circuit is sealed and the mill operated whilst the organic grinding liquid and material being ground is continuously circulated through the mill. There are filters to prevent the grinding particles from leaving the mill and there can be a reservoir in the circuit to store grinding liquid and to allow for changes in volume during grinding.

Alternatively if a continuous or semi-continuous process is to be used a plurality of mills may be connected in series and the product from the first mill is passed directly to the second and so to the last mill where the finished product is removed. This avoids the need for recirculation of the material. Dilution of the grinding liquid can be carried out by the addition of more liquid between the mills.

With the higher speed agitator mills for example those with a peripheral speed of 1500 feet/min. or above, it is possible to grind in a viscose liquid such as a blend of a volatile organic liquid and the lubricating oil to be thickened to a grease. After grinding the volatile organic liquid can be removed e.g. by evaporation, to leave behind a grease composition comprising the lubricating oil thickened by the oleophilic solid. In order to control the viscosity of the grinding medium more of the volatile organic liquid can be added as the grinding liquid viscosity increases due to the comminution of the solid. Alternatively or additionally the temperature of the grinding liquid can be increased to decrease the viscosity.

In one embodiment of the invention a grease composition is formed by grinding graphite in a lubricating oil which is heated to a sufficiently high temperature to prevent the graphite or metal sulphide/oil mixture from becoming too viscous and causing the grinding efficiency to drop. After grinding the hot oil/oleophilic graphite is separated from the grinding particles, more oil is added if needed, and the composition is optionally passed through a homogeniser. During grinding more oil can be added to maintain the viscosity within the desired limits.

The wax can be added before, during, or after grinding, but preferably it is added just before the end of the grinding.

The waxes suitable for use in the present invention are animal or vegetable waxes, petroleum waxes and synthetic waxes. The waxes used preferably have a melting point below 210° C., more preferably below 200° C. and most preferably below 150° C.

The animal and vegetable waxes such as beeswax and carnauba wax are usually higher fatty esters of fatty acids of molecular weight below about 1000 e.g. the palmitic and cerotic esters of myristyl or cetyl alcohol.

The petroleum waxes can be obtained by the de-waxing of crude petroleum oils during their refining e.g. by solvent de-waxing. They are usually parffinic hydrocarbons of molecular weight below about 1500, often they contain some oil.

Suitably synthetic waxes include polyolefin waxes such as polyethylene wax, polyamide waxes, polyalkylene glycol ether waxes and polyester waxes.

The synthetic waxes preferably have a molecular weight below about 2000.

The oleophilic graphite grease preferably contains from 5–20% weight of the graphite and up to 10%, more preferably 0.05 to 10.0% and most preferably 0.1 to 7.5% by weight of the wax. It has been found that by incorporating wax the amount of oleophilic graphite required to obtain a grease of a specified hardness can be reduced, in some cases considerably.

Preferred waxes are the petroleum waxes, polyethylene and polyamide waxes.

The invention will now be described with reference to the following example.

EXAMPLE 1

An agitator mill known by the trade name Unimill RS2 made by Ateliers Sussmeyer SP.RL consisting essentially of a cylindrical-grinding chamber surrounded by a jacket through which a heated liquid can flow. A shaft having plain discs equidistantly spaced on it is mounted in the chamber in air tight seals. The bottom disc is perforated. The slurry enters through a one-way valve at the bottom and is led out of a slurry outlet at the top. The shaft is driven at 1500 r.p.m. by a motor. This mill was connected into a closed circuit comprising a pump and a reservoir. The mill had a nominal capacity of 2 U.S. gallons, and the reservoir had a 4 gallon capacity. The grinding chamber of the mill was filled with a mixture of a lubricating base oil BG 160/95 (a solvent refined oil of viscosity 160 Redwood No. 1 secs. at 140° F. and viscosity index 95) and a paraffinic fraction, derived from petroleum, of boiling range between 70 and 100° C. (referred to as SBP2).

The mill and pumps were operated and the graphite ground, and the slurry formed after grinding for hours was removed from the pump eixit. The SBP2 was removed from the slurry by evaporation and a grease formed.

The mill was 70% filled with the grinding particles and graphite. A paraffinic slack wax of softening point 70° C. was added in amount such that the oil plus graphite plus wax contained 15% wt. graphite 5% wt. wax.

The results are shown in the accompanying graph.

A grease of the same hardness with no wax is included for comparison.

In the graph line A contains 5% wt. of the wax, based on graphite weight, line B 2% wt. of the wax and line C no wax.

As can be seen the addition of the wax prevents hardening of the grease at higher temperatures without having any appreciable effect at lower temperatures.

We claim:

1. A grease composition comprising a lubricating base oil thickened to a grease consistency by a wax-modified oleophilic thickenening amount of graphite prepared by grinding graphite in an organic grinding liquid which distills below 500° C., has a viscosity below 600 centistokes at 100° F. and a surface tension below 72 dynes/cm. at 25° C., in the substantial absence of air, in the presence of a wax, the weight of graphite in the graphite grinding liquid mixture being 2–20% wt., the grinding being carried out in a mill selected from vibratory mills and agitator mills, and the wax being a petroleum paraffinic wax having a softening point below 150° C. and being present in the final grease in the amount of from about 0.05 weight percent to about 10 weight percent.

2. A grease composition as claimed in claim 1 in which the organic grinding liquid is a lubricating oil diluted with a lower boiling point hydrocarbon, and after grinding the lower boiling point liquid is removed.

3. A grease composition as claimed in claim 1 in which the organic grinding liquid is a heated lubricating oil.

References Cited

UNITED STATES PATENTS

| | | | |
|---|---|---|---|
| 3,518,191 | 6/1970 | Groszek et al. | 252—29 |
| 3,384,583 | 5/1968 | Groszek et al. | 252—29 |
| 3,083,160 | 3/1963 | Agius et al. | 252—29 |
| 3,046,223 | 7/1962 | Morris | 252—29 |
| 2,710,839 | 6/1955 | Swakon et al. | 252—29 |
| 3,607,746 | 9/1971 | Caruso | 252—29 |

FOREIGN PATENTS

| | | | |
|---|---|---|---|
| 45,270 | 11/1961 | Poland | 252—29 |

DANIEL E. WYMAN, Primary Examiner

I. VAUGHN, Assistant Examiner

U.S. Cl. X.R.

252—59